Patented Nov. 6, 1951

2,573,674

UNITED STATES PATENT OFFICE 2,573,674

SULFONYL HALIDE MANUFACTURE

Chester E. Adams, Highland, Ind., and Wayne A. Proell, Chicago, Ill., assignors to Standard Oil Company, Chicago, Ill., a corporation of Indiana No Drawing. Application July 26, 1950, Serial No. 176,062

11 Claims. (Cl. 260—543)

This invention relates to a novel process for the preparation of certain organic sulfonyl chlorides and bromides. More particularly, it relates to a process for the catalytic oxidation of certain organic sulfenyl chlorides and bromides with a gas containing free oxygen in the presence of nitrogen oxide catalysts.

One object of our invention is to provide a novel process for the preparation of certain organic sulfonyl chlorides and bromides. Another object is to provide a novel catalytic process for the oxidation of highly unstable alkanesulfenyl chlorides and bromides containing alpha-hydrogen atoms to produce the corresponding sulfonyl halides. A further object of our invention is to provide a catalytic process for the oxidation of certain organic sulfenyl chlorides and bromides, which process can be operated at low temperatures in order to avoid substantial thermal decomposition of said sulfenyl chlorides and bromides and in order to avoid hydrolysis of the products, viz., sulfonyl chlorides and bromides.

A further object of our invention is to provide a two-stage process for the conversion of non-tertiary hydrocarbon disulfides to the corresponding hydrocarbon sulfonyl chlorides and bromides, said process being characterized by extremely high halogen efficiency. These and other objects of our invention will become apparent from the ensuing description thereof.

We have discovered that certain organic sulfenyl chlorides and bromides can be smoothly oxidized to the corresponding sulfonyl compounds by oxygen in the presence of a catalytic proportion of nitrogen dioxide, or a substance yielding nitrogen dioxide under the reaction conditions, at low temperatures and pressures. The process of the present invention is particularly applicable to non-tertiary hydrocarbon sulfenyl chlorides or bromides. The application of the catalytic oxidation process herein described and claimed makes it possible, for the first time so far as we know, to effect the oxidation of highly unstable and novel saturated hydrocarbon sulfenyl chlorides or bromides containing at least one alpha-hydrogen atom (i. e. non-tertiary sulfenyl chlorides or bromides) to produce the corresponding sulfonyl compounds in high yields while substantially avoiding thermal decomposition of the unstable charging stock and/or hydrolysis of the sulfonyl halide product.

Briefly, in accordance with our invention, an organic sulfenyl halide having the general formula RSX, wherein R is a non-tertiary saturated hydrocarbon radical or the like, S is sulfur and X is a halogen selected from the group consisting of chlorine and bromine, is treated with a free oxygen-containing gas, for example, air or oxygen-enriched air, under substantially anhydrous conditions in the presence of a catalytic proportion of $NO_2$, usually varying between about 1 and about 20 percent by weight of the oxidizing gas stream, at low oxidation temperatures between about −20° C. and about 30° C., for example, about 10° C. to about 20° C., and initial partial pressures of oxygen varying from about 0.1 to about 5 atmospheres, the total pressure being ordinarily sufficient to maintain the sulfenyl halide feed stock substantially in the liquid condition in the reaction zone. Since the catalytic oxidation process is exothermic, it is desirable to remove heat from the reaction zone at a rate sufficient to maintain the reaction temperature within desired limits.

The present oxidation process is particularly applicable to non-tertiary saturated hydrocarbon sulfenyl chlorides and bromides. Numerous aromatic sulfenyl chlorides and bromides, as well as substituted aromatic derivatives such as nitro-derivatives thereof, have been prepared and may be employed as charging stocks. In general, aromatic sulfenyl chlorides and bromides are considerably more stable, thermally, than aliphatic sulfenyl chlorides and bromides. More particularly, aromatic hydrocarbon sulfenyl chlorides and bromides are considerably more stable, thermally, than saturated hydrocarbon sulfenyl chlorides and bromides, particularly species of the latter category, which are non-tertiary, i. e. which contain hydrogen (alpha-hydrogen) linked to the carbon atom which is bound to the sulfur atom of the saturated hydrocarbon sulfenyl chloride or bromide. Because of their great thermal instability, non-tertiary saturated hydrocarbon sulfenyl chlorides or bromides cannot be successfully oxidized to corresponding sulfonyl halides by the conventional techniques, employing hot concentrated nitric acid as the oxidant and glacial acetic acid as the reaction medium.

Examples of suitable aromatic sulfenyl chloride and bromide charging stocks are those in which the aromatic radical is an aromatic hydrocarbon radical, for example, phenyl, tolyl, xylyl, cumyl, ethylphenyl, naphthyl, methylnaphthyl, xenyl and the like. The aromatic radical which is linked to the sulfur in the sulfenyl chloride or bromide charging stock may also contain substituents such as halogen, nitro, carboxyl or other atoms or groups.

Examples of saturated hydrocarbon sulfenyl chloride and bromide charging stocks are those in which the hydrocarbon radical is non-tertiary alkyl, e. g., methyl, ethyl, n-propyl, isopropyl, n-butyl, 2-methylpropyl, neopentyl, n-amyl, isoamyl, n-hexyl, n-octyl, isooctyl, n-decyl, n-dodecyl, n-tetradecyl, n-hexadecyl, n-octadecyl; non-tertiary cycloalkyl, e. g., cyclopentyl, cyclohexyl, ortho- or para-methylcyclohexyl, 2- or 3-methylcyclopentyl, bornyl; non-tertiary aralkyl, e. g., benzyl, phenethyl and the like. The saturated hydrocarbon group may be substituted by non-reactive substituents such as halogen or other groups.

The low temperature chlorinolysis of non-tertiary saturated hydrocarbon disulfides to produce corresponding sulfenyl chlorides is specifically described and claimed in a copending application for U. S. Letters Patent, Serial No. 176,061, filed of even date herewith by Wilbur B. Chilcote and Bernard H. Shoemaker. The synthesis of tertiary alkanesulfenyl chlorides is extremely difficult to effect by low temperature chlorinolysis of the corresponding disulfides and produces only very low yields, of the order of 5 weight percent based on disulfide feed stock.

The catalytic oxidation process of the present invention can be applied to individual sulfenyl chlorides or bromides or to mixtures of various sulfenyl chlorides and/or bromides. A particularly desirable application of the present catalytic oxidation process is to a mixture of non-tertiary alkanesulfenyl chlorides which can be obtained by low temperature chlorinolysis of mixtures of non-tertiary alkyl disulfides, such as are commercially produced by the treatment of naphthas by means of the well-known caustic-solutizer extraction processes and catalytic oxidation of the resultant mercaptide-containing caustic solutions with air or oxygen. Low temperature chlorinolysis of these disulfide mixtures produces a mixture of alkanesulfenyl chlorides containing predominantly methyl, ethyl, n-propyl and isopropyl groups.

The sulfenyl chloride or bromide charging stock may contain non-reactive diluents, for example between about 5 and about 50 percent by volume of paraffinic hydrocarbons, small proportions of hydrocarbon disulfides, etc. Inert diluents or solvents may be employed in the present catalytic oxidation process but, as a rule, these are not necessary.

The catalytic oxidation process can be conducted at temperatures between about $-20°$ C. and about $+30°$ C. Usually, it is convenient to operate at temperatures between about 5° C. and about 20° C. and temperatures between about 5° C. and about 10° C. are preferred, since at these temperatures the rate of oxidation of the charging stock is substantially greater than the rate of decomposition of even highly unstable charging stocks such as methanesulfenyl chloride, ethanesulfenyl chloride and the like. However, it will be apparent that when more stable charging stocks are employed, for example phenylsulfenyl chloride or o-nitrophenylsulfenyl chloride, higher reaction temperatures between about 20° C. and about 40° C. can be conveniently employed, and in general the reaction temperature is adjusted to the stability of the sulfenyl halide.

The oxidant in the present process is oxygen, which may be employed as such. However, it is preferable to employ relatively dilute oxygen streams, for example as in air, flue gases containing desired proportions of oxygen, mixtures of oxygen with $CO_2$ or gaseous hydrocarbons such as methane or ethane, and the like.

The initial partial pressure of oxygen charged to the oxidation reaction zone may be varied between about 0.1 and about 5 atmospheres and is usually selected between about 0.2 and 0.5 atmosphere. It will be apparent that the oxidation rate will increase with increasing oxygen partial pressures in the reaction zone under otherwise constant reaction conditions, particularly catalyst concentration. The total pressure in the oxidation reaction will usually vary between about 15 and about 100 p. s. i. g. As will be apparent from the operating examples hereinafter set forth, the catalytic oxidation process can be conveniently effected at substantially atmospheric pressure, employing air as the oxidant gas stream.

The essential catalyst employed in the present process is nitrogen dioxide. Ordinarily, nitrogen dioxide concentrations between about 0.05 and about 1 part by weight of $NO_2$, per part by weight of oxygen can be employed. The rate of oxidation tends to increase with increasing $NO_2$ concentration in the reaction zone, other reaction conditions remaining constant. As will appear hereinafter in certain operating examples, the induction period frequently encountered in the oxidation process can be appreciably reduced by initiating reaction in the presence of relatively large proportions of $NO_2$, for example between about 0.5 and about 5 parts by weight of $NO_2$ per part by weight of oxygen, following which the $NO_2$ concentration in the oxidant gas stream can be reduced to a substantially lower level, for example between about 0.01 and about 1 part by weight of $NO_2$ per part by weight of oxygen, and the reaction can then be continued to the desired extent or to completion.

It will be apparent that in lieu of or in addition to $NO_2$, we can employ materials which will yield $NO_2$ in the oxidation reaction zone under the reaction conditions. Thus, for example, as is well-known, $NO_2$ is ordinarily in equilibrium with $N_2O_4$ and it will be apparent, therefore, that $N_2O_4$ can be employed in the present process in addition to $NO_2$ or in lieu thereof. It is also known that nitric oxide, NO, in the presence of oxygen, is in equilibrium with $NO_2$, which, in turn, is usually in equilibrium with $N_2O_4$. Therefore, nitric oxide can be employed as the source of $NO_2$ in the oxidation zone in the process of the present invention. Likewise, $N_2O_3$ is usually in equilibrium with both NO and $NO_2$. In view of these and similar considerations it will be apparent, therefore, that in lieu of or in addition to $NO_2$, we may employ NO, $N_2O_3$, $N_2O_4$ and $N_2O_5$. Although it is well-known that nitric acid can decompose under certain conditions to yield $NO_2$, ordinarily we do not desire to employ nitric acid as a source of catalyst, since its decomposition also yields water, and it is desired to effect the present process in the substantial absence of water, which leads to undesirable side reactions such as hydrolysis of the charging stock and especially formation of large amounts of sulfonic acids as by-products instead of the desired sulfonyl halide reaction product.

The $NO_2$ serves as a catalyst in the present oxidation process and can, for the most part, be recovered unchanged upon completion of the reaction. Upon completion of the desired reaction, catalyst which is either physically absorbed in the liquid reaction product or present therein as nitrosylsulfonic acid, can be distilled out or stripped therefrom by a stream of stripping gas such as nitrogen, air, $CO_2$ or the like, and thereafter recovered by conventional methods and reused. Catalyst present in the effluent gas stream during the operation of the present process can, likewise, be recovered by conventional means and recycled for use in the present process.

The reaction period will depend, to a considerable extent, upon the extent of oxidation sought to be effected and upon the other reaction conditions such as temperature, oxygen concentration, catalyst concentration, reactivity of the particular charging stock, intimacy of contact, etc. Ordinarily, substantial oxidation can be effected within reaction periods selected with the range of about 60 to about 600 minutes. It will be apparent that desirable reaction periods can readily be determined by small scale runs in specific instances.

Our novel oxidation process may be carried out batchwise, continuously or semi-continuously. The oxidation process may also be effected in a number of stages, with or without product separation between stages. The oxidation reaction may be effected in conventional reaction kettles or autoclaves, or in a tubular convertor or contacting tower. A suitable form of reactor is a vertical tower provided with contacting means such as bubble cap trays or with packing such as ceramic bodies or fiber glass mats. Concurrent contacting of liquid sulfur compound feed stock and the oxidizing gas stream proceeds efficiently in the types of reaction tower just described; the liquid feed is passed downwardly through the tower together with a stream of oxidizing gas, all of which may be admitted at a point near the top of the tower or in aliquot portions at vertically spaced points along the tower. A tubular reactor equipped for spaced injection of oxidizing gas into a flowing stream of liquid or vaporized feed stock and oxidation products may also be employed; a reactor of this type permits fine control of the extent of oxidation.

The following operating examples are included for the purpose of illustrating specific applications of the invention and not with the intent of unnecessarily delimiting the same.

EXAMPLE 1

Ethyl disulfide (51.3 g.) was contacted with chlorine at temperatures between $-20$ and $-30°$ C. for 145 minutes, at which time 29.8 g. of chlorine had been absorbed. A sample of the chlorinolysis reaction mixture was treated with aqueous potassium iodide, liberating iodine. The iodine was titrated with sodium thiosulfate and it was found that the chlorinolysis reaction product contained approximately 96.6 weight percent of ethanesulfenyl chloride. The chlorinolysis reaction mixture was allowed to warm up to $15°$ C. and a mixture of 16 weight percent $NO_2$ and 84 percent dry air was passed therethrough at the rate of 1 cubic foot per hour (standard conditions). No oxidation occurred for 7 minutes, at which time oxidation set in. At the end of 15 minutes, 15 percent of the oxygen charged was being absorbed by the reaction mixture. The temperature during the oxidation operation was maintained between $15°$ C. and $21°$ C. The oxidation was considered completed at the end of 284 minutes, at which time very little further amounts of oxygen were being absorbed by the reaction mixture. From the oxidation, 97.5 g. of product were obtained of which 67.5 g. consisted of ethanesulfonyl chloride, boiling range 175–$181°$ C., $n_D^{20}$ 1.4820. The ethanesulfonyl chloride was separated from the reaction products by distillation under a pressure of 2 mm. of mercury. The yield of ethanesulfonyl chloride was 65.5 percent of theoretical, based on the amount of ethanesulfenyl chloride available for the oxidation reaction. The bottoms obtained by vacuum distillation of the reaction mixture contained 8.79 g. of acid, calculated as ethanesulfonic acid.

EXAMPLE 2

Chlorinolysis of ethyl disulfide (25 g.) was effected by the absorption of 14.5 g. of chlorine therein at temperatures between 23 and $32°$ C. over the course of 90 minutes. The crude reaction mixture was stripped with dry nitrogen to flush unreacted chlorine therefrom. The crude reaction mixture was then contacted with a gas stream containing between 13 and 20 weight percent $NO_2$, the remainder being dry air at the rate of 0.8 cubic foot per hour (standard conditions). A smooth oxidation reaction ensued at room temperature (21–$29°$ C.) and was completed in 240 minutes. The oxidation reaction products were fractionally distilled under a pressure of 1.4 mm. of mercury, yielding 29.7 g. of ethanesulfonyl chloride, boiling range 177–$185°$ C., $n_D^{20}$ 1.4820, which is equivalent to 56.5 percent of theory based on the disulfide charging stock.

EXAMPLE 3

A glass, concurrent flow, air-lift gas-liquid reactor of the type used in the oxidation of disulfides to alkanesulfonic acids (essentially as shown in Figure 2 of W. A. Proell, U. S. Patent 2,489,316) was charged with 43.0 g. (.242 mols) of 2-butyl disulfide. A mixture of approximately 20 percent chlorine and 80 percent dry nitrogen was passed into the cold ($-30$ to $-40°$ C.) disulfide for 83 minutes. The nitrogen rate was 0.9 cubic foot per hour at 20 mm. of mercury pressure. This was followed by a 15 minute flush with dry nitrogen to remove unreacted chlorine. Samples were then withdrawn and the 2-butanesulfenyl chloride content found to be 89 percent by KI titration. The chlorinolysis reaction mixture was then treated in the same reactor with a mixture of 15 weight percent $NO_2$ and 85 weight percent dry air at temperatures between 11 and $25°$ C. at the rate of 0.9 cubic foot per hour (standard conditions). Oxidation began immediately and proceeded smoothly, accelerating to maximum absorption of 100 percent oxygen at 80 minutes. Oxidation was complete in 244 minutes. Distillation at 1.0 mm. mercury pressure yielded 56.2 g. (.359 mols) of 2-butanesulfonyl chloride boiling at 204–$205°$ C. at 1 atmosphere ($38°$ C. at 1.0 mm., $44°$ C. at 1.70 mm. of mercury), $n_D^{20.1}$ 1.4527, containing 20.2 percent sulfur and 22.6 percent chlorine. The yield was 88 percent of theory based on 2-butanesulfenyl chloride available for reaction and 78 percent based on the disulfide charging stock. The bottoms had an acidity equivalent to 3.49 g. (0.0253 mols) of the corresponding sulfonic acid.

EXAMPLE 4

Plant disulfide oil having an average molecular weight of 122 (58.2 g.; 0.475 mol calculated as ethyl disulfide) was charged to the glass reactor employed in Example 3. Chlorinolysis was effected for 175 minutes with a mixture of chlorine and dry nitrogen at such a rate that .209 gram (.00294 mol) of chlorine per minute entered the reactor. The temperature was maintained in the range of −30 to −40° C. A 15 minute flush with dry nitrogen served to carry out any unreacted chlorine. Samples were withdrawn and the RSCl content found to be 74 percent, calculated as ethanesulfenyl chloride, by KI titration. The crude mixed sulfenyl chlorides were then treated in the same reactor at 17 to 23° C. with a mixture of 23 percent $NO_2$ and 77 percent air for 158 minutes (at the rate of .75 cubic feet of air per hour, standard conditions). Oxidation began immediately and accelerated to a peak oxygen absorption rate of 100 percent at 103 minutes. When oxidation ceased, the products were removed from the reactor, benzene (as a solvent) serving to effect good transfer, washed with 50 cc. of water and then distilled. Mixed sulfonyl chlorides (80.9 g.) were obtained and found to have the following inspections:

| Wt., g. | Boiling Range | Per Cent S | Per Cent Cl | $n_D^{30.1}$ |
|---|---|---|---|---|
| 12.7 | 63° C. at 19 mm. to 45° C. at 5 mm. | 24.2 | 26.68 | 1.4551 |
| 21.2 | 45° C. at 5.0 mm. to 42° C. at 3.5 mm. | 22.54 | 26.12 | 1.4568 |
| 14.0 | 42° C. at 3.5 mm. to 44° C. at 3.8 mm. | 23.34 | 26.60 | 1.4568 |
| 13.0 | 44° C. at 3.8 mm. to 45° C. at 3.6 mm. | 22.64 | 24.60 | 1.4522 |
| 20.0 | 45° C. at 3.6 mm. to 49° C. at 4.5 mm. | 23.88 | 25.50 | 1.4588 |

The boiling range of the products indicates the presence of methane, ethane and isomeric propanesulfonyl chlorides. The yield, assuming the mixed sulfonyl chlorides to have the average molecular weight of ethanesulfonyl chloride, was 66.6 percent based on disulfide oil charged and 90 percent based on the sulfenyl chloride content of the disulfide oil which had been subjected to low temperature chlorinolysis.

Data from the above and two additional examples are presented in the following table.

In general, it may be said that the reaction products are reddish-orange oils containing considerable dissolved $NO_2$, and nitrosylsulfonic acids, in addition to the sulfonyl chlorides and some sulfonic anhydrides. They are conveniently worked up by direct distillation, in which case provision must be made for handling the gaseous $NO_2$ evolved, or by water washing and distilling. The latter procedure removes all nitrogen oxides and sulfonic acids, leaving a crude sulfonyl chloride of fairly good purity. This latter material is distilled, which removes water and yields a pure sulfonyl chloride as distillate. Sulfonyl chlorides hydrolyze at room temperature at a slow rate and it is advisable not to allow wet sulfonyl chlorides to stand too long. The distilled sulfonyl chlorides are usually water-white mobile oils, identifiable by refractive index and by characteristic sulfonamide derivatives.

The hydrocarbon sulfonyl chlorides produced by the process of the present invention can be employed as starting materials to effect numerous chemical conversions. The non-tertiary alkanesulfonyl chlorides produced by the present process can be hydrolyzed to produce pure alkanesulfonic acids which can be employed as electroplating media, especially for high speed (high current density) copper plating baths. The pure sulfonic acids are also highly useful esterification catalysts, especially for the esterification of acid-sensitive materials such as cellulose, glycols, polybasic acids, etc.

Copending Serial No. 176,063 of even date, filed by Wayne A. Proell and Wilbur B. Chilcote relates to the use of partially oxidized feed stock as a primer to avoid an induction period in $NO_2$-catalyzed oxidation of sulfenyl halides. Copending Serial No. 176,064 of even date, filed by Wayne A. Proell et al. relates to a one-step process for the preparation of sulfonyl chlorides by the treatment of hydrocarbon disulfides with chlorine and oxygen in the presence of $NO_2$ catalyst.

Having thus described our invention, what we claim is:

1. A process for the preparation of a hydrocarbon sulfonyl halide having the general formula $RSO_2X$ wherein R is a non-tertiary hydrocarbon radical and X is selected from the class consisting of chlorine and bromine, which process comprises contacting the corresponding hydrocarbon sulfenyl halide in an oxidation zone with a gas containing free oxygen and a catalytic quantity of nitrogen dioxide at a reaction temperature between about −20° C. and about 30° C. while substantially excluding water from said oxidation zone.

2. A process for the preparation of a non-tertiary saturated hydrocarbon sulfonyl chloride, which process comprises contacting the corresponding non-tertiary saturated hydrocarbon sulfenyl chloride in an oxidation zone with a gas containing free oxygen and a catalytic quantity of nitrogen dioxide at a reaction temperature between about −20° C. and about 30° C. while substantially excluding water from said oxidation zone.

3. A process for the preparation of a hydrocarbon sulfonyl chloride having the general formula $RSO_2Cl$ wherein R is a non-tertiary alkyl radical, which process comprises contacting the corresponding hydrocarbon sulfenyl chloride in an oxidation zone with a gas containing free oxygen and a catalytic quantity of nitrogen dioxide at a reaction temperature between about −20 and about 30° C. while substantially excluding water from said oxidation zone.

4. The process of claim 3 wherein the sulfenyl chloride is ethanesulfenyl chloride.

Table

| Ex. | Feed | Time, Min. | | Temp., °C. | | $NO_2$, Wt. Per cent of Gas | Yield RSCl | Yield Based on Disulfide | | $RSO_2Cl$ Yield Based on RSCl |
|---|---|---|---|---|---|---|---|---|---|---|
| | | Chlorination | Oxidation | Chlorination | Oxidation | | | $RSO_2Cl$ | $RSO_3OH$ | |
| 1 | Ethyl Disulfide | 145 | 284 | −20 to −30 | 14 to 25 | 16 | 96.6 | 62.8 | 9.5 | 64.7 |
| 2 | do | 90 | 240 | 23 to 32 | 21 to 29 | 13 | | 56.6 | 8.0 | |
| 3 | 2-Butyl Disulfide | 83 | 244 | −30 to −40 | 11 to 25 | 15 | 89 | 77 | 4 | 88 |
| 4 | Plant Disulfides | 175 | 158 | −30 to −40 | 17 to 23 | 23 | 74.1 | 66.6 | | 90 |
| 5 | Ethyl Disulfide | 145 | 180 | −20 to −30 | 16 to 28 | [1] 40 | | 67 | 12 | |
| 6 | do | 126 | 286 | +14 to +21 | 11 to 21 | 24 | 91 | 72.9 | 12.85 | 80.7 |

[1] 40% initial; then 8%.

5. The process of claim 3 wherein the sulfenyl chloride is 2-butanesulfenyl chloride.

6. The process of claim 3 wherein the sulfenyl chloride is a mixture of alkanesulfenyl chlorides containing 1 to 3 carbon atoms, inclusive, in the alkyl group.

7. A unitary process for the production of a non-tertiary saturated hydrocarbon sulfonyl chloride, which process comprises contacting a non-tertiary saturated hydrocarbon disulfide with chlorine at a chlorinolysis reaction temperature between about −40° C. and about 20° C., employing sufficient chlorine to effect substantial chlorinolysis of said disulfide but insufficient to effect quantitative chlorinolysis in order to produce a chlorinolysis reaction mixture containing at least 5 percent of unconverted hydrocarbon disulfide, initiating oxidation by subjecting the resultant crude chlorinolysis reaction mixture without purification to contact in an oxidation reaction zone with an oxidant gas containing free oxygen and also nitrogen dioxide in an amount between about 0.5 and about 5 parts by weight per part by weight of the oxygen present in said oxygen-containing gas at a temperature between about −20° C. and about 30° C. while substantially excluding water from said oxidation reaction zone and, after the onset of substantial oxidation, reducing the proportion of NO₂ to a value between about 0.05 and about 0.5 part by weight per part by weight of oxygen in said oxidant gas and continuing the oxidation.

8. A process for the preparation of a hydrocarbon sulfonyl halide having the general formula RSO₂X wherein R is a non-tertiary hydrocarbon radical and X is selected from the class consisting of chlorine and bromine, which process comprises contacting the corresponding hydrocarbon sulfenyl halide in an oxidation zone with a gas containing free oxygen and a catalytic quantity of nitrogen dioxide at a reaction temperature between about 5° C. and about 20° C. while substantially excluding water from said oxidation zone.

9. A process for the preparation of a non-tertiary saturated hydrocarbon sulfonyl chloride, which process comprises contacting the corresponding non-tertiary saturated hydrocarbon sulfenyl chloride in an oxidation zone with a gas containing free oxygen and a catalytic quantity of nitrogen dioxide at a reaction temperature between about 5° C. and about 20° C. while substantially excluding water from said oxidation zone.

10. A unitary process for the production of a non-tertiary saturated hydrocarbon sulfonyl chloride, which process comprises contacting a non-tertiary saturated hydrocarbon disulfide with chlorine at a chlorinolysis reaction temperature between about −40° C. and about 20° C. to produce a reaction mixture containing a substantial proportion of a non-tertiary saturated hydrocarbon sulfenyl chloride, thereafter contacting said reaction mixture in an oxidation zone with a gas containing free oxygen and a catalytic quantity of nitrogen dioxide at a reaction temperature between about −20° C. and about 30° C. while substantially excluding water from said oxidation zone, and separating a non-tertiary saturated hydrocarbon sulfonyl chloride so produced.

11. The process of claim 10 wherein the reaction temperature in said oxidation zone is between about 5° C. and about 20° C.

CHESTER E. ADAMS.
WAYNE A. PROELL.

No references cited.